March 29, 1966   C. L. DAY   3,243,072
FACEPLATE SEAL
Filed Oct. 4, 1963
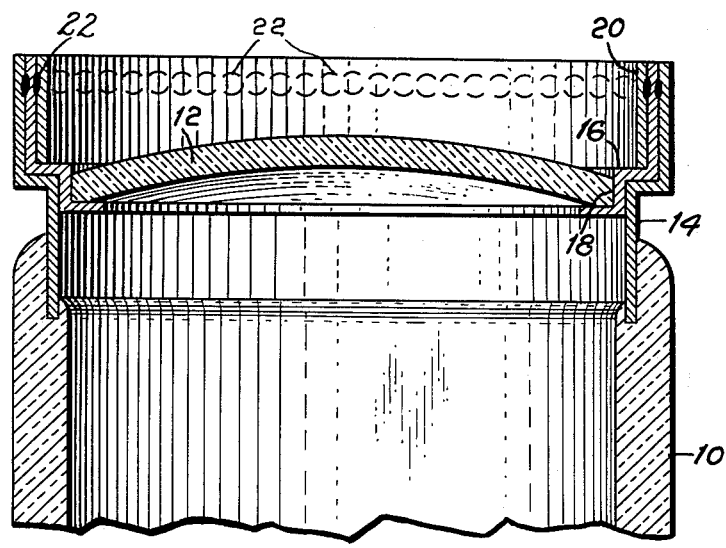
INVENTOR.
CYRIL L. DAY
BY Edward Goldberg
ATTORNEY 3,243,072
FACEPLATE SEAL
Cyril L. Day, Huntington, Ind., assignor to International Telephone and Telegraph Corporation, Nutley, N.J., a corporation of Maryland
Filed Oct. 4, 1963, Ser. No. 314,016
11 Claims. (Cl. 220—2.3)

This invention relates to the sealing of faceplates to an electron tube envelope and particularly to a novel structure and method for sealing crystalline faceplates to glass.

Normal glass to glass or glass to metal seals for vacuum tubes utilize a direct heating and fusing process which is well known and does not present any unusual difficulties. However, in special purpose tubes such as image converters it is sometimes desirable to use crystalline windows which are transmissive to particular invisible radiation wavelengths. Sealing of a glass body to a non-glass faceplate is complicated by the existence of different temperature expansion characteristics. One solution for this problem has been to use stepped layers of glass having specifically designed varying thermal properties to provide a graded seal between the two materials. This is an empirical process which is costly and time consuming. Another method has utilized a deformable metallic sleeve which is sealed by adhesive layers. The latter construction however, does not have sufficient mechanical strength and vacuum tightness for many applications.

It is therefore an object of the present invention to provide a relatively strong vacuum tight seal between a faceplate and the envelope wherein the temperature expansion characteristic of the faceplate is substantially different from that of the envelope material; and a further object is a simplified method of making such a seal.

This is achieved by a novel sandwich or layered structure of inner and outer metal rings which can be seam welded about an intermediate ring of ductile metal such as silver. The external rings are preferably of a nickel-cobalt and iron composition. The outer metal ring is sealed separately to the glass envelope and the crystalline faceplate is cemented to the intermediate silver ring. The concentric inner metallic ring is positioned adjacent the silver ring and then seam welded to the outer ring to complete the seal. The details of the invention will be more fully understood and other objects and advantages will become apparent in the following description and accompanying drawing wherein, the figure shows a fragmentary sectional view of the novel seal structure.

A glass envelope 10 for an electron tube such as an image tube which can convert invisible radiations to visual images, has a faceplate or window 12 formed of a crystalline material such as fused silica quartz or lithium fluoride which may be transmissive to particular infra-red or ultra-violet wavelengths. A first metallic ring 14, preferably of Kovar, is sealed separately to the end of the envelope by a well known heat fusion process. The faceplate is inserted in a separate stepped support ring 16 of a relatively flexible metal, preferably silver, which can absorb any unequal thermal stresses. A coating of silver chloride cement is applied at 18 between the periphery of the plate and the stepped base of the silver ring 16 and is baked at about 500° C. to form a vacuum-tight seal. The silver ring is also highly resistant to dissolution by silver chloride.

The faceplate and silver ring assembly are then inserted into the correspondingly stepped outer Kovar ring 14 extending from envelope 10. A further inner concentric Kovar ring 20 is positioned and supported within the silver ring 16 to form a cup-shaped sandwich structure, with the inner Kovar ring being spaced from the cement to prevent corrosion thereby. The three layers are then sealed together by suitable seam welding equipment which forms a series of small overlapping spot welds 22 around the circumference. The seam weld permits rapid dissipation of heat to avoid high thermal stresses and oxidation of adjacent elements.

The Kovar material is a well known commercially available metallic composition of nickel-cobalt and iron that is wettable by silver and has a high electrical resistance which makes it particularly suitable for seam welding. Other metals having equivalent properties may similarly be utilized. In addition, copper may be employed in place of silver as the ductile metallic intermediate layer if a suitable cement, such as epoxy instead of silver chloride, is used.

It may thus be seen that the present invention provides a novel crystalline faceplate seal for a tube that is of simple construction and improved strength and vacuum tightness. While only a single embodiment has been illustrated, it is apparent that the invention is not limited to the exact form or use shown and that many other variations may be made in the particular design and configuration without departing from the scope of the invention as set forth in the appended claims.

What is claimed is:
1. A faceplate seal for an electron tube comprising:
   an envelope;
   an outer metallic ring secured to and projecting from one end of said envelope;
   a faceplate having a temperature expansion characteristic substantially different from that of said envelope;
   an intermediate metallic ring of ductile metal positioned within and abutting said outer ring and having an inner surface secured to said faceplate; a coating of cement forming a vacuum-tight seal securing said faceplate and intermediate ring, said ductile metal being resistant to dissolution in said cement;
   an inner metallic ring disposed within said intermediate ring and extending outwardly of said faceplate; and
   a weld securing said three rings together to form a vacuum tight seal.
2. The device of claim 1 wherein said outer and intermediate rings are stepped, said faceplate and inner ring being supported on respective steps within said intermediate ring and said intermediate ring being supported on a step within said outer ring.
3. The device of claim 1 wherein said intermediate ring is formed of silver and said coating comprises silver chloride cement securing the periphery of said faceplate to said intermediate ring, said inner ring being spaced from said cement.
4. The device of claim 1 wherein said faceplate is formed of material transparent to infra-red radiations.
5. The device of claim 1 wherein said faceplate is formed of material transparent to ultra-violet radiations.
6. The device of claim 1 wherein said faceplate is formed of fused silica.
7. The device of claim 1 wherein said faceplate is formed of lithium fluoride.
8. The device of claim 1 wherein said intermediate ring of ductile metal is formed of copper.
9. The device of claim 1 wherein said weld comprises a series of overlapping spot welds around the circumference of said inner and outer rings.
10. The device of claim 3 wherein said envelope is formed of glass and said inner and outer rings are formed of a composition of nickel, cobalt and iron.
11. A method for sealing a faceplate on an electron tube envelope comprising:
   fusing an outer metallic ring to the end of a glass envelope;

applying a coating of silver chloride cement to the periphery of a crystalline faceplate;
positioning said faceplate within a silver ring;
heating said faceplate and silver ring to form a vacuum-tight seal;
positioning said sealed silver ring and faceplate within said outer ring;
positioning an inner metallic ring within said silver ring; and
welding about the circumference of said rings to form a vacuum-tight seal.

References Cited by the Examiner

UNITED STATES PATENTS

| | | | |
|---|---|---|---|
| 2,708,250 | 5/1955 | Day | 220—2.3 X |
| 2,723,044 | 11/1955 | Barasch | 220—2.3 |
| 2,915,153 | 12/1959 | Hitchcock. | |
| 2,987,686 | 6/1961 | McQuistan | 189—36.5 X |
| 3,115,957 | 12/1963 | Heil | 220—2.3 X |
| 3,179,213 | 4/1965 | Kuehne et al. | 189—36.5 |

THERON E. CONDON, *Primary Examiner.*

M. L. RICE, *Assistant Examiner.*